United States Patent [19]
Ozaki et al.

[11] Patent Number: 5,253,127
[45] Date of Patent: Oct. 12, 1993

[54] VIDEO TAPE RECORDER HAVING A SPECIAL DEMAGNETIZING FUNCTION

[75] Inventors: Yukihiko Ozaki; Eiji Moro; Susumu Ohtsuka; Takeo Ohkouchi, all of Katsuta, Japan

[73] Assignee: Hitachi, Ltd., Tokyo, Japan

[21] Appl. No.: 730,077

[22] Filed: Jul. 15, 1991

[30] Foreign Application Priority Data

Jul. 18, 1990 [JP] Japan .................. 2-188071

[51] Int. Cl.$^5$ .............................. G11B 5/02
[52] U.S. Cl. ........................ 360/57; 360/66
[58] Field of Search ............ 360/57, 66, 118

[56] References Cited
U.S. PATENT DOCUMENTS 5,050,012 9/1991 Nishiumi et al. ............ 360/66

FOREIGN PATENT DOCUMENTS 119703 6/1987 Japan .................. 360/57
169703 7/1989 Japan .
269203 10/1989 Japan .

Primary Examiner—Paul Gensler
Attorney, Agent, or Firm—Antonelli, Terry, Stout & Kraus

[57] ABSTRACT

A demagnetizing circuit of a home use video tape recorder is controlled by using means such as a control by a microcomputer or the like so as to execute a demagnetizing operation in a desired tape position interval. Further, by properly controlling an onscreen-display on a monitor display screen or a display on a VTR display tube, the operating efficiency is further improved.

10 Claims, 4 Drawing Sheets

VIDEO TAPE RECORDER HAVING A SPECIAL DEMAGNETIZING FUNCTION

BACKGROUND OF THE INVENTION

The present invention relates to a home use video tape recorder and, more particularly, to a video tape recorder (hereinafter, referred to as a VTR) having a special demagnetizing function to execute a demagnetizing operation which is not accompanied with a recording operation.

Hitherto, as an apparatus for demagnetizing the recorded content on a magnetic tape at a high speed, as disclosed in JP-A-1-269203, a high-speed demagnetizing apparatus which demagnetizes the recorded signal while running a magnetic tape at a speed which is n times as high as a tape running speed in the normal reproducing mode has been proposed. As a demagnetizing method, the magnetic tape is run at the ordinary tape running speed at the initial stage of the start of the demagnetization, the recorded signal is demagnetized by three kinds of erasing heads comprising a full-width erasing head, a rotary erasing head, and an audio erasing head, and after the elapse of a predetermined time, the magnetic tape is run at a speed which is n times as high as the ordinary tape running speed, the erasing operation is executed by using only the full-width erasing head, and thereby enabling the high-speed demagnetization to be performed without causing a situation such that the recorded signal remains without being erased. Examples of the ordinary demagnetizing operation and the high-speed demagnetizing operation to which the ordinary demagnetizing operation is applied will now be described hereinbelow with reference to FIGS. 1, 2, and 3. FIG. 1 shows an example of a block diagram of a home use VTR. In FIG. 1, reference numeral 1 denotes a VTR; 2 a signal system block; 2a a video processing section; 2b an audio processing section; 2c a demagnetizing circuit section; 3 a power source section; 4 a microcomputer (hereinafter, abbreviated to a micom); 5 a character adding device; 6 a display section; 7 a driving system block; 8 a remote controller receiver; 9 a monitor; and 10 a remote controller (hereinafter, abbreviated to a remocon). FIG. 2 is a diagram showing a mechanism of the home use VTR. In FIG. 2, reference numeral 11 denotes a supply reel; 12 a fullwidth erasing head; 13 a magnetic tape; 14 guide posts to guide the magnetic tape so as to accurately keep a running path of the magnetic tape; 15 video recording/playback heads (CH-1/CH-2); 16 a rotary erasing head; 17 Hi-Fi audio recording/playback heads; 18 a rotary head cylinder; 19 an audio/control signal erasing head; 20 an audio/control signal recording/playback head; 21 a pinch roller; 22 a capstan; and 23 a take-up reel. FIG. 3 is a diagram showing track patterns recorded on the magnetic tape. In FIG. 3, reference numeral 24 denotes a CH-1 video track; 25 a CH-2 video track; 26 a linear audio track; and 27 a control track. In FIGS. 2 and 3, the magnetic tape 13 wound around the supply reel 11 is guided by the pinch roller 21 and the capstan 22 and is wound around, the take-up reel 23. In the tape path between the supply reel 11 and the take-up reel 23, the magnetic tape 13 is in contact with six kinds of heads 12, 15, 16, 17, 19, and 20 and a signal is erased, recorded, and reproduced. In the normal recording mode, on the magnetic tape 13 supplied from the supply reel 11, the signals on all of the tracks are first erased by the full-width erasing head 12, the video signal and the Hi-Fi audio signal are subsequently recorded by the video recording/playback heads 15 and the Hi-Fi audio recording/playback heads 17, the signals on the linear audio track 26 and the control track 27 are erased by the audio/control signal erasing head 19, and a linear audio signal and a control signal are finally recorded by the audio/control signal recording/playback head 20. In the case that video signals are recorded on the previously recorded video signals of a magnetic tape, the signals on only the video tracks (24 and 25) are erased by the rotary erasing head 16 instead of the full-width erasing head 12 for a few seconds just after the start of recording the video signals on the previously recorded video signals of the magnetic tape. In the playback mode, the above three kinds of erasing heads (full-width erasing head 12, rotary erasing head 16, audio/control signal erasing head 19) are made inoperative but only the above three kinds of recording/playback heads (video signal recording/playback heads 15, Hi-Fi audio recording/playback heads 17, audio/control signal recording/playback head 20) are made operative to thereby execute the reproduction. In FIG. 1, the micom 4 sends control signals to the driving system block 7, thereby controlling the tape sending operation and the mechanical operations such as cylinder rotations and the like. The micom 4 sends control signals to the signal system block 2, thereby controlling the switching operations of signal processes including the operations of the various kinds of heads. In addition to the above controls, the micom 4 also executes an ON/OFF control of the power source section 3, a character insertion control by the character adding device 5, and a control of the display section 6 of the VTR. Although the ordinary demagnetizing operation is executed only just before the recording operation, a special demagnetizing function is realized by executing the demagnetizing operation which is not accompanied with the recording operation. On the other hand, a high-speed demagnetizing function is realized by executing the special demagnetizing operation by setting the running speed of the magnetic tape to a speed which is n times as high as the ordinary running speed.

In the above conventional technique, nothing is considered with respect to the improvement of a use efficiency such that the special demagnetizing function is made operative for which tape position interval by which operation or the like.

SUMMARY OF THE INVENTION

It is an object of the invention to provide a video tape recorder as a home use VTR which can realize a special demagnetizing operation of a recorded tape at a high use efficiency.

To accomplish the above object, a demagnetizing circuit of a home use VTR is controlled by using means such as a control by a microcomputer or the like so that a demagnetizing operation is performed in a desired tape position interval. Further, an operating efficiency is further improved by properly controlling an OSD display on a monitor display screen (hereinafter, referred to as an OSD (on screen display)) or a display on a VTR display tube.

According to the above technical means, in the home use VTR, the special demagnetizing operation of a high use efficiency can be realized for a recorded tape. In addition, the special demagnetizing function can be easily operated by an instruction by a display of the OSD or the like.

DESCRIPTION OF THE PREFERRED EMBODIMENT

Figure 2:
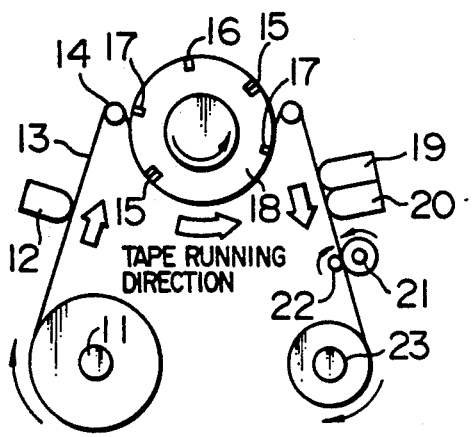
FIG. 2 is a diagram showing a mechanism of a home use VTR.
Figure 3:
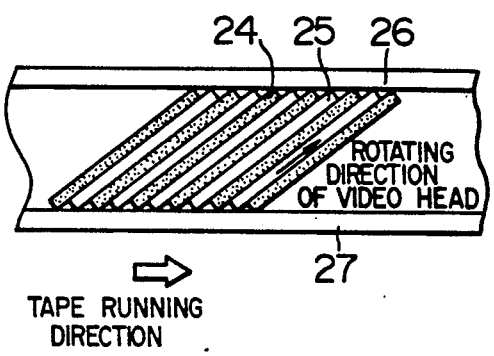
FIG. 3 is a diagram of a track pattern formed on a magnetic tape.
Figure 4:
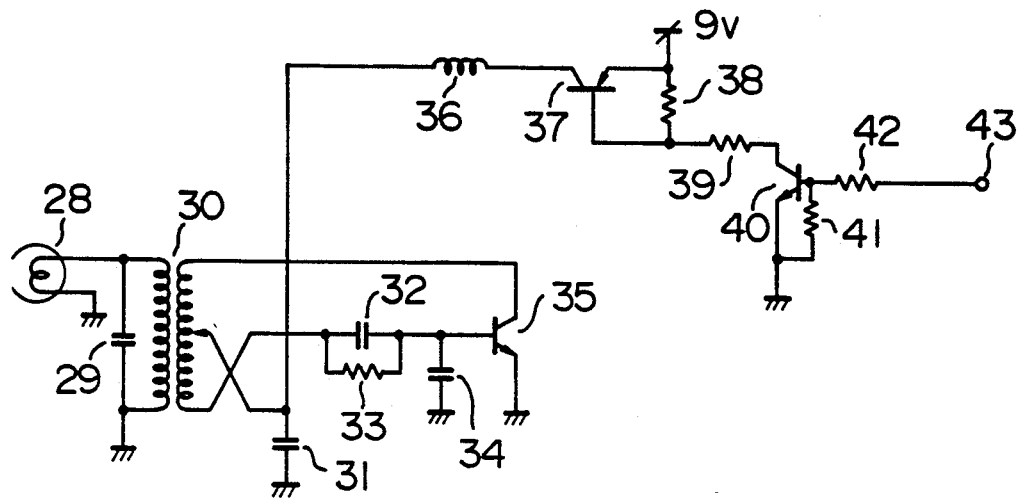
FIG. 4 is a diagram showing a circuit example of a demagnetizing circuit section in a signal system in FIG. 1.

An embodiment of the invention will be described hereinbelow with reference to the drawings. Descriptions regarding FIGS. 1, 2, and 3 have already been made above. FIG. 4 shows an example of a practical circuit diagram of the demagnetizing circuit section 2c in the signal system block 2 in FIG. 1. In FIG. 4, reference numeral 28 denotes an erasing head; 29, 31, 32, and 34 indicate capacitors; 30 a transformer; 33, 38, 39, 41, and 42 resistors; 35 and 40 npn transistors; 36 a coil; 37 a pnp transistor; and 43 a control terminal. By applying a high level signal to the control terminal 43, the erasing head 28 can be made operative.

Figure 1:
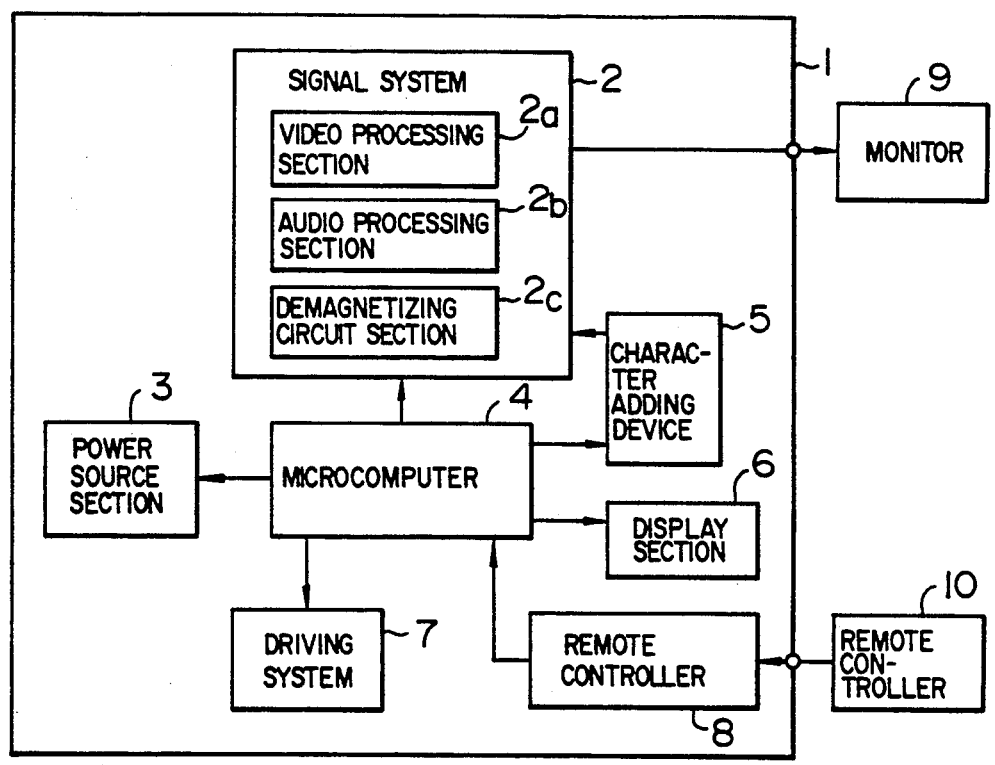
FIG. 1 is a block diagram showing an embodiment of the invention.
Figure 5:
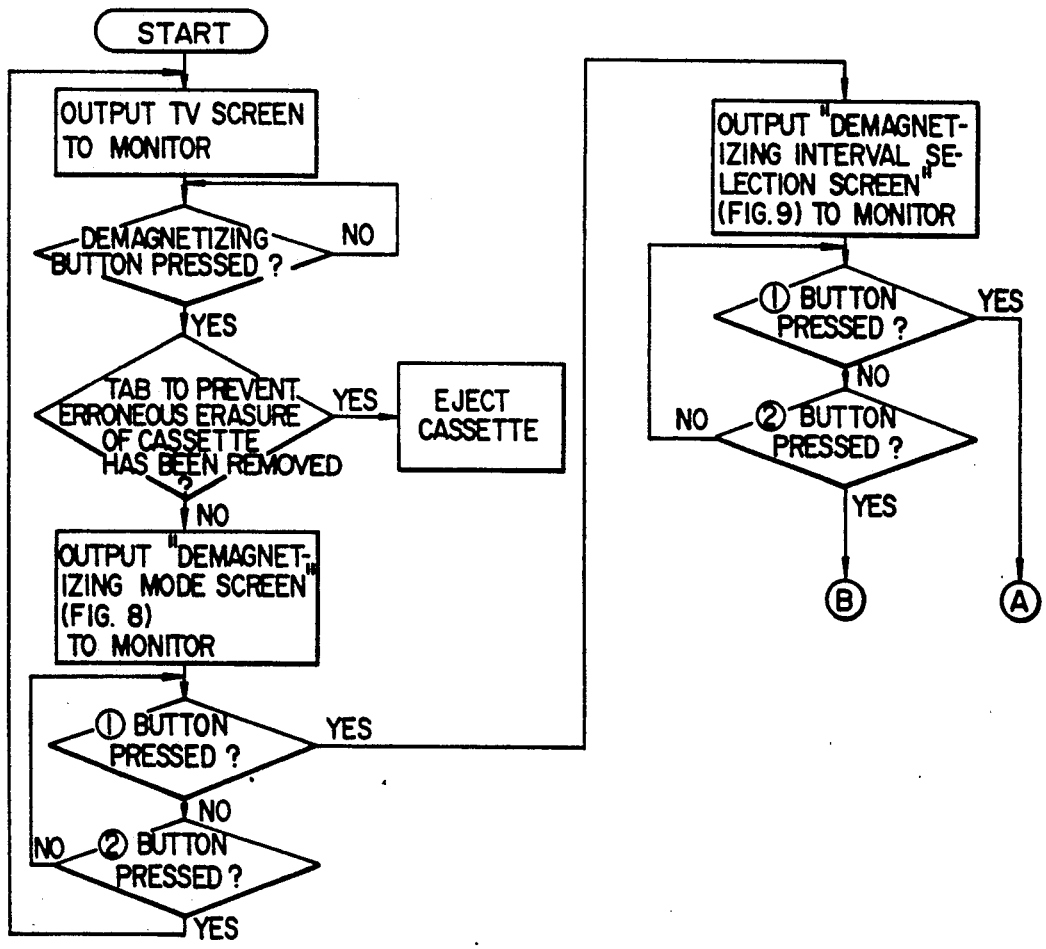
FIGS. 5 to 7 are diagrams showing flowcharts of an embodiment of the invention.
Figure 6:
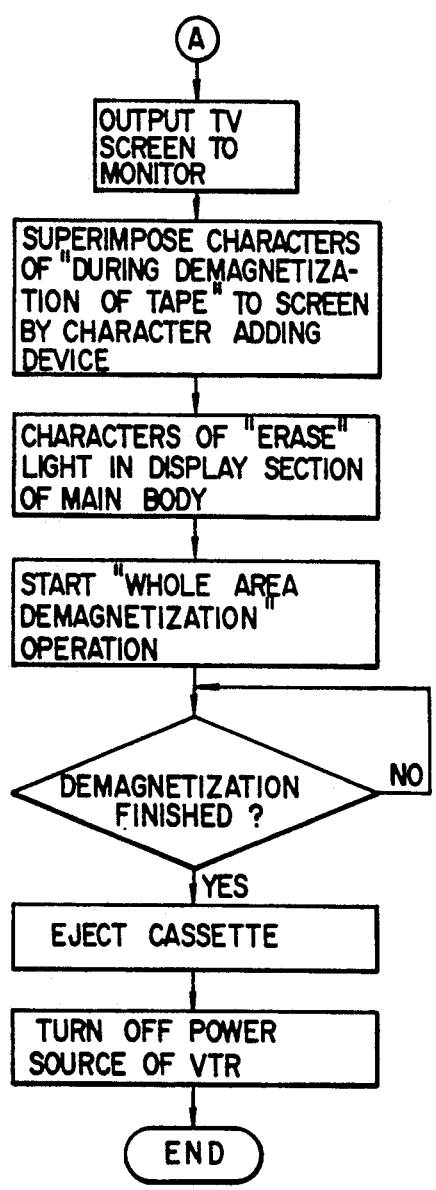
Figure 7:
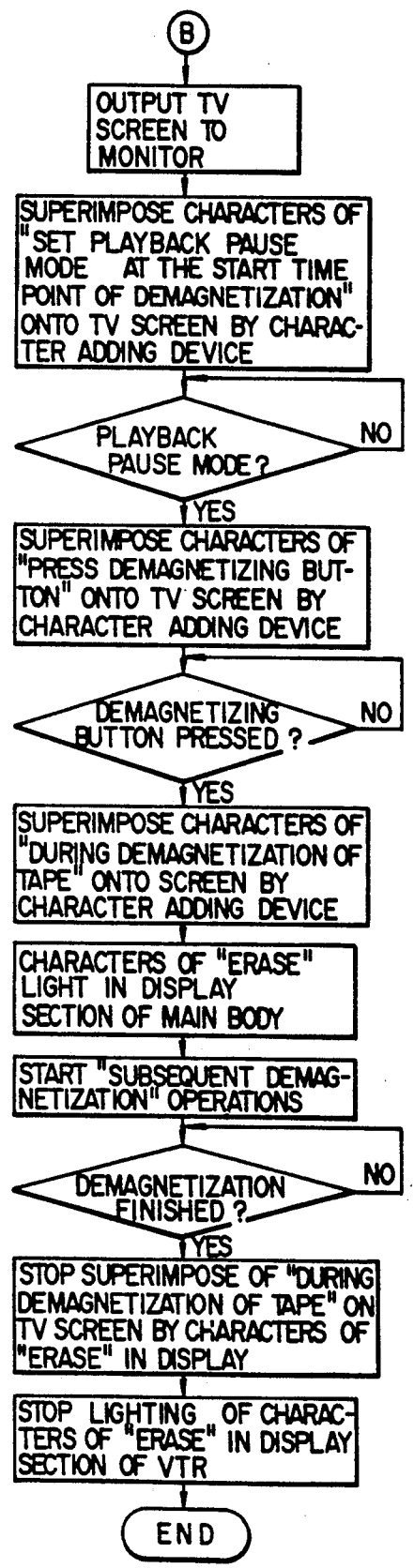
Figure 8:
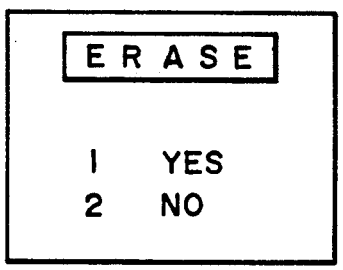
FIGS. 8 to 12 are diagrams showing examples of screen displays on a monitor 9 in FIG. 1.

An embodiment of an operating method of the special demagnetizing function using the OSD will now be described. FIGS. 5, 6, and 7 are diagrams showing flowcharts of the embodiment of the operating method of the special demagnetizing function. FIGS. 8, 9, 10, 11, and 12 are diagrams showing example of screen displays on the monitor 9 in FIG. 1. In FIG. 1, by first pressing a special demagnetizing operation button of the remocon 10, a signal to start the demagnetizing operation is sent to the micom 4 from the remocon receiver 8. In the above state, the micom 4 discriminates whether a tab to prevent an erroneous erasure of a video cassette has been cut out or not, i.e., removed. If YES, a signal to eject the video cassette is sent to the driving system block 7. If NO, a control signal is sent to the signal system block 2 and a demagnetization start pictureplane is output to the monitor 9. An example of the demagnetization start picture is shown in FIG. 8. If the special demagnetizing operation button has erroneously been pressed, by pressing a ② button of numeral keys of the remocon 10, "2 NO" in FIG. 8 is selected and the micom 4 sends a control signal to the signal system block 2, so that an operating state is returned to a state before the special demagnetizing operation button is pressed. In the case of demagnetizing, by pressing a ① button of the numeral keys of the remocon 10, "1 YES" in FIG. 8 is selected and the micom 4 sends a control signal to the signal system 2 and outputs a demagnetization area designation picture shown in FIG. 9 to the monitor 9. The micom 4 doesn't respond even if any button other than the ① and ② buttons of the remocon 10 is pressed.

Figure 9:
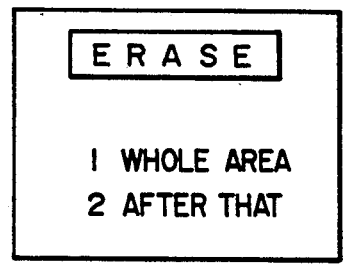
Figure 10:
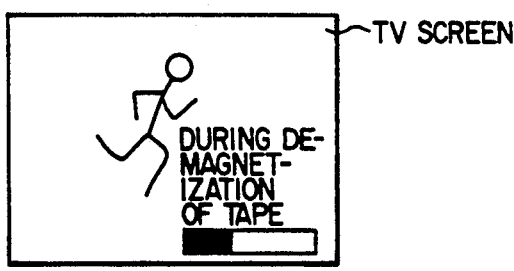
Figure 11:
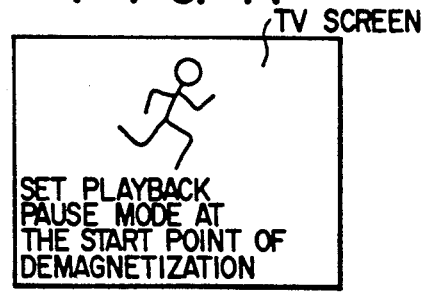
Figure 12:
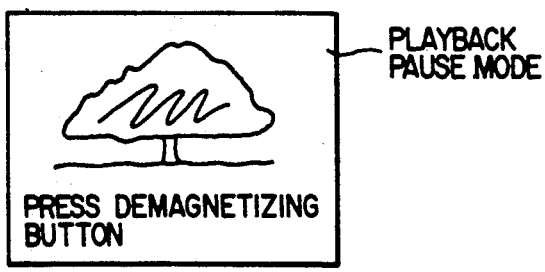

A demagnetizing interval is subsequently designated by selecting either one of the selection items "1" and "2" in FIG. 9 by the user. When "1 whole area" is selected by depressing the ① button of the remocon 10, the micom 4 sends control signals to the signal system block 2 and the character adding device 5. A television broadcasting picture in which characters "during demagnetization of tape" and a bar graph indicative of a demagnetizing state have been superimposed is displayed on the monitor 9. At the same time, the micom 4 sends a control signal to the demagnetizing circuit section 2c in the signal system block 2, thereby starting the demagnetizing operation. FIG. 10 shows an example of the picture in the above case. Simultaneously with the demagnetizing operation, the micom 4 sends a control signal to the dispay section 6 and characters of "ERASE" light in the display section 6 of the VTR. The "whole area demagnetizing operation" in FIG. 6 denotes a series of operations such that the whole area of the magnetic tape is demagnetized and, after completion of the demagnetization, the magnetic tape is rewound to the beginning of the tape and the operation is stopped. As an example of a practical demagnetizing method, it is also possible to use a method whereby the magnetic tape is rewound to the beginning of the tape, the tape is demagnetized while forwardly sending the tape from the beginning to the end of the tape, and the tape is again rewound to the beginning and is stopped or a method whereby the magnetic tape is sent to the end of the tape at a fast speed, the tape is demagnetized while reversely sending the magnetic tape from the end to the head, and the tape is stopped. After completion of the demagnetizing operation, the micom 4 sends control signals to the driving system block 7 and the power source section 3, respectively, and ejects the tape cassette and turns off the power source of the VTR. For the whole area demagnetizing operation, in FIG. 9, when "2 after that" is selected by pressing the ② button of the remocon 10, the micom 4 sends control signals to the signal system block 2 and the character adding device 5. A TV picture in which characters of "set playback pause mode at the start point of demagnetization" have been superimposed is output to the monitor 9. FIG. 11 shows an example of the picture in the above case. When the user gives pause to playback (sets playback pause mode) at a desired demagnetization start position, the micom 4 sends a control signal to the character adding device 5. A playback pause picture in which characters of "press demagnetizing button" have been superimposed is output to the monitor 9. FIG. 12 shows an example of the picture in the above case.

When the user subsequently presses the special demagnetizing operation button, the micom 4 sends control signals to the signal system block 2 and the character adding device 5. A TV broadcasting picture in which characters of "during demagnetization of tape" and a bar graph indicative of a demagnetizing state have been superimposed shown in FIG. 10 is displayed on the monitor 9. At the same time, the micom 4 sends a control signal to the demagnetizing circuit section 2c in the signal system block 2, thereby starting the demagnetizing operation. Simultaneously with the demagnetizing operation, the micom 4 sends a control signal to the display section 6 and characters of "ERASE" light in the display section 6 of the VTR. The "subsequent demagnetizing operations" in FIG. 7 denote a series of operations such that the magnetic tape in a range from the position of the tape which has been arbitrarily designated by the user to the end of the tape is demagnetized and, after completion of the demagnetization, the magnetic tape is again rewound to the demagnetization start position and stopped. As a practical demagnetizing method, it is also possible to use a method whereby the magnetic tape after the designated demagnetization start point is demagnetized to the end of the tape while forwardly sending the tape and, after completion of the demagnetization of the tape to the end, the magnetic tape is again rewound to the demagnetization start point and stopped or a method whereby the magnetic tape is first sent to the end of the tape at a fast speed and the tape is demagnetized to the designated demagnetization start point while reversely feeding the magnetic tape from the end and is stopped. To detect the demagnetization start point, means using tape position information on the control track 27 in FIG. 3 is effective. After completion of the demagnetizing operation, the micom 4 sends a control signal to the character adding device 5 and the superimposing process of the characters of the TV picture on the monitor 9 is stopped. At the same time, the micom 4 also sends a control signal to the display section 6 and stops the lighting of the characters of "ERASE" in the display section of the VTR. On the other hand, if the tape position information on the control track is used in addition to the two kinds of designated demagnetizing intervals and the position at the end of the demagnetizing operation is designated in addition to the position designation at the start of the demagnetizing operation and the demagnetizing operation only within the designated interval is executed by the microcomputer, the magnetic tape in a range between the designated two points can be demagnetized.

According to the invention, there are advantages such that with respect to the operation of the special demagnetizing function, a plurality of kinds of demagnetizing intervals can be designated and the designated items can be displayed on the OSD and the use efficiency is improved.

What is claimed is:

1. A home use video tape recorder comprising:
   means for effecting a special demagnetizing function so as to execute a demagnetizing operation of a magnetic tape without carrying out a recording operation;
   selecting means for designating an interval of the magnetic tape to be demagnetized including a first interval to be demagnetized from a beginning to an end of an entire area of the magnetic tape, a second interval to be demagnetized from the beginning to a present position of the magnetic tape, and a third interval to be demagnetized from the present position of the magnetic tape to the end of the magnetic tape; and
   control means responsive to the selecting means for controlling the special demagnetizing function means to demagnetize a selected interval of the magnetic tape selected by the selecting means.

2. A home use video tape recorder according to claim 1, wherein the selecting means for designating an interval of the magnetic tape to be demagnetized includes means for designating an interval between any two selected positions of the tape designated independently of the present position of the magnetic tape for the demagnetizing operation.

3. A home use video tape recorder according to claim 1, further comprising means for displaying the selected interval to be demagnetized on a display screen.

4. A home use video tape recorder according to claim 1, further comprising means for starting the special demagnetizing function means from a temporarily stopped state for reproduction of the magnetic tape.

5. A home use video tape recorder comprising:
   means for effecting a special demagnetizing function so as to execute a demagnetizing operation of a magnetic tape without carrying out a recording operation;
   means for discriminating whether a video cassette of the magnetic tape has a tab thereof which is removed so as to prevent an erroneous erasure of the magnetic tape is present or absent; and
   means for automatically ejecting the video cassette in response to a request for operating the special demagnetizing function means without starting the special demagnetizing function means in accordance with the discriminating means discriminating that the tab is absent.

6. A home use video tape recorder comprising:
   means for effecting a special demagnetizing function so as to execute a demagnetizing operation of a magnetic tape without carrying out a recording operation; and
   control means for controlling the special demagnetizing function means for executing a demagnetization of a whole area of the magnetic tape, for effecting rewinding of the magnetic tape to the beginning of the magnetic tape and for stopping the magnetic tape at the beginning of the magnetic tape even if the starting of the special demagnetizing function means is initiated from an arbitrary position of the magnetic tape.

7. A home use video tape recorder according to claim 6, wherein the control means is responsive to a request for operation of the special demagnetizing function means for firstly rewinding the magnetic tape to the beginning thereof, for operating the special demagnetizing function means to demagnetize the tape while forwarding the magnetic tape from the beginning to the end of the tape so that the whole area of the tape is demagnetized, for subsequently rewinding the tape to the beginning thereof, and for stopping the tape at the beginning thereof.

8. A home use video tape recorder according to claim 6, wherein the control means is responsive to a request for operating the special demagnetizing function means for forwarding the magnetic tape from a present position thereof to an end of the magnetic tape at a fast speed, for operating the special demagnetizing function means while rewinding the magnetic tape from the end thereof to a beginning of the magnetic tape so that a whole area of the tape is demagnetized, and for stopping the magnetic tape at the beginning thereof.

9. A home use video tape recorder comprising:
   means for effecting a special demagnetizing function so as to execute a demagnetizing operation of a magnetic tape without carrying out a recording operation; and
   control means for controlling the special demagnetizing function means in response to a request for operation thereof so as to demagnetize the magnetic tape in a range from a tape position where the request is initiated to an end of the magnetic tape, and thereafter for causing rewinding of the tape to the tape position where the request to start was initiated, and for stopping the magnetic tape at the request tape position.

10. A home use video tape recorder comprising:
    means for effecting a special demagnetizing function so as to execute a demagnetizing operation of a magnetic tape without carrying out a recording operation; and control means responsive to a request for operation of the special demagnetizing function means for forwarding the tape at a fast speed from a tape position where the request is initiated to an end of the magnetic tape, for operating the special demagnetizing function means while rewinding the magnetic tape from the end thereof to the tape position where the request was initiated so as to demagnetize the magnetic tape from the end to the request tape position, and for stopping the magnetic tape at the request tape position.

* * * * *